(12) United States Patent
Zhou

(10) Patent No.: US 10,853,457 B2
(45) Date of Patent: Dec. 1, 2020

(54) SYSTEM AND METHOD FOR PROGRAM SECURITY PROTECTION

(71) Applicant: DiDi Research America, LLC, Mountain View, CA (US)

(72) Inventor: Wu Zhou, Mountain View, CA (US)

(73) Assignee: DiDi Research America, LLC, Mountain View, CA (US)

( * ) Notice: Subject to any disclaimer, the term of this patent is extended or adjusted under 35 U.S.C. 154(b) by 303 days.

(21) Appl. No.: 15/889,715

(22) Filed: Feb. 6, 2018

(65) Prior Publication Data

US 2020/0028873 A1    Jan. 23, 2020

(51) Int. Cl.
| | |
|---|---|
| *G06F 21/12* | (2013.01) |
| *H04L 29/06* | (2006.01) |
| *G06F 21/52* | (2013.01) |
| *G06K 9/62* | (2006.01) |
| *G06F 21/55* | (2013.01) |
| *G06F 9/54* | (2006.01) |

(52) U.S. Cl.
CPC .............. *G06F 21/12* (2013.01); *G06F 21/52* (2013.01); *G06F 21/552* (2013.01); *G06K 9/6201* (2013.01); *H04L 63/12* (2013.01); *H04L 63/123* (2013.01); *H04L 63/126* (2013.01); *H04L 63/1441* (2013.01); *H04L 63/1466* (2013.01); *H04L 63/1483* (2013.01); *G06F 9/547* (2013.01); *G06K 9/6215* (2013.01); *H04L 63/0281* (2013.01)

(58) Field of Classification Search
CPC . H04L 63/12; H04L 63/1483; H04L 63/1466; H04L 63/1441; G06F 21/12; G06F 21/52; G06K 9/6201; G06K 9/6215
See application file for complete search history.

(56) References Cited

U.S. PATENT DOCUMENTS

| | | | |
|---|---|---|---|
| 6,775,780 B1 * | 8/2004 | Muttik | G06F 21/53 |
| | | | 713/165 |
| 7,596,809 B2 | 9/2009 | Chien et al. | |
| 9,009,821 B2 | 4/2015 | Podjarny et al. | |

(Continued)

FOREIGN PATENT DOCUMENTS

| | | |
|---|---|---|
| CN | 103875207 A | 6/2014 |
| EP | 1914655 B1 | 10/2013 |

(Continued)

OTHER PUBLICATIONS

Qiao, Y., Yang, Y., Ji, L. and He, J., Jul. 2013. Analyzing malware by abstracting the frequent item sets in API call sequences. In 2013 12th IEEE international conference on trust, security and privacy in computing and communications (pp. 265-270). IEEE. (Year: 2013).*

(Continued)

*Primary Examiner* — Robert B Leung
(74) *Attorney, Agent, or Firm* — Sheppard Mullin Richter & Hampton LLP

(57) ABSTRACT

Systems and methods are provided for program security protection. An exemplary method for program security protection may comprise obtaining data packets transceived by a first program, analyzing similarities among the obtained data packets for a plurality of transmissions, and determining a security threat to the first program based on the analyzed similarities.

14 Claims, 6 Drawing Sheets

410

412: Obtaining information of Application Programming Interface (API) calls executed by a first program 414: Analyzing similarities among the obtained API call information 416: Determining a security threat to the first program based on the analyzed similarities

(56) References Cited

U.S. PATENT DOCUMENTS

| | | | |
|---|---|---|---|
| 9,135,417 | B2 | 9/2015 | Wang et al. |
| 9,712,490 | B1* | 7/2017 | Burns ................. H04L 63/0254 |
| 10,089,448 | B1 | 10/2018 | Zhou |
| 2002/0184311 | A1 | 12/2002 | Traversat et al. |
| 2003/0212913 | A1* | 11/2003 | Vella ..................... G06F 21/563 726/24 |
| 2003/0223367 | A1 | 12/2003 | Shay et al. |
| 2004/0220920 | A1 | 11/2004 | Bax et al. |
| 2005/0144544 | A1* | 6/2005 | Gariador ............ H04L 63/1466 714/724 |
| 2006/0123464 | A1 | 6/2006 | Goodman et al. |
| 2008/0022378 | A1 | 1/2008 | Repasi et al. |
| 2009/0126017 | A1* | 5/2009 | Chahal ................... G06F 21/54 726/23 |
| 2009/0138971 | A1* | 5/2009 | Butti .................. H04L 63/1408 726/23 |
| 2009/0225676 | A1 | 9/2009 | Kisela et al. |
| 2013/0091578 | A1 | 4/2013 | Bisht et al. |
| 2013/0291103 | A1 | 10/2013 | Davenport et al. |
| 2015/0200955 | A1 | 7/2015 | Martin |
| 2016/0232351 | A1 | 8/2016 | Guo et al. |
| 2016/0294852 | A1 | 10/2016 | Hagen |
| 2017/0161260 | A1* | 6/2017 | Wang ..................... G06F 40/30 |
| 2017/0302644 | A1 | 10/2017 | Goodwin |

FOREIGN PATENT DOCUMENTS

| | | |
|---|---|---|
| TW | I314705 B | 9/2009 |
| TW | 201220119 A | 5/2012 |
| TW | 201349850 A | 12/2013 |

OTHER PUBLICATIONS

Alkhateeb, E.M.S., Aug. 2017. Dynamic malware detection using API similarity. In 2017 IEEE International Conference on Computer and Information Technology (CIT) (pp. 297-301). IEEE. (Year: 2017).*

802.11 Wireless Networks: The Definitive Guide, 2nd Edition. Matthew S. Gast. Apr. 2005. O'Reilly Media, Inc. (Chapter 4) (Year: 2005).*

First Action Interview Pilot Program Pre-Interview Communication issued in U.S. Appl. No. 15/923,240, dated May 10, 2018, 4 pages.

Wagner and Fischer. "The String-to-String Correction Problem". Journal of the ACM (JACM). vol. 21, No. 1, Jan. 21, 1974, pp. 168-173, 9 pages.

Novarro. "A guided tour to approximate string matching". ACM Computing Surveys, vol. 33, No. 1, Mar. 2001, pp. 31-88. 58 pages.

Ristad and Yianilos. "Learning String-Edit Distance". IEEE Transactions on Pattern Analysis and Machine Intelligence. vol. 20, No. 5, May 1998, pp. 522-532, 11 pages.

PCT International Search Report and the Written Opinion dated Dec. 20, 2018, issued in related International Application No. PCT/US18/54301 (7 pages).

Search Report with Notice of Allowance dated Jul. 17, 2019, issued in related Taiwan Application No. 108104326 (5 pages).

* cited by examiner

SYSTEM AND METHOD FOR PROGRAM SECURITY PROTECTION

TECHNICAL FIELD

This disclosure generally relates to methods and devices for program security protection, and in particular, to methods and devices for application security audit.

BACKGROUND

Mobile phone applications have been commonly installed for various functions, but also have become targets for hackers. The hackers may steal sensitive or private information, impersonate the real user, or perform other kinds of illegal or unethical activities. Therefore, it is critical to diligently improve the application security for protection of the users and the application developer.

SUMMARY

Various embodiments of the present disclosure can include systems, methods, and non-transitory computer readable media for program security protection. According to one aspect, an exemplary method for program security protection may comprise obtaining data packets transceived (transmitted or received) by a first program, analyzing similarities among the obtained data packets for a plurality of transmissions, and determining a security threat to the first program based on the analyzed similarities.

In some embodiments, obtaining the data packets transceived by the first program may comprise obtaining the data packets transceived by the first program via a second program, the second program being configured to relay the transmission between the first program and an external device.

In some embodiments, the first program may comprise a software application installed on a computing device, and the second program may comprise a man-in-the-middle proxy installed on the computing device.

In some embodiments, the obtained packets may comprise at least one of a header, a payload, or a trailer, the header may comprise at least one of a Uniform Resource Locator (URL) or one or more parameters, and the parameters may comprise at least one of a token, a fingerprint, a time, a key, or a username.

In some embodiments, the plurality of transmissions may comprise a first transmission and a second transmission. The first transmission may transmit at least first data packets, the first data packets comprising a first time and at least one of a first token or a first fingerprint. The second transmission may transmit at least second data packets, the second data packets comprising a second time and at least one of a second token or a second fingerprint. Analyzing the similarities among the obtained data packets for the plurality of transmissions may comprise obtaining (1) similarities between the first time and the second time and (2) at least one of: similarities between the first token and the second token or similarities between the first fingerprint and the second fingerprint. Determining the security threat to the first program based on the analyzed similarities may comprise determining the second transmission as associated with the security threat, in response to determining that (1) the first time is earlier than the second time, and (2) at least one of: the first token and the second token are the same or the first fingerprint and the second fingerprint are the same.

In some embodiments, the obtained data packets may comprise a first data packet and a second data packet. Analyzing the similarities among the obtained data packets may comprise determining a number of atomic operations required to change a first string X of the first data packet to a second string Y of the second data packet. The atomic operation may be selected from: inserting, deleting, or exchanging a string character.

In some embodiments, the first string X may have a length i, the second string Y may have a length j, the number of atomic operations required to change the first string X to the second string Y may be $D(X_i, Y_j)$. Determining the number of atomic operations required to change the first string X of the first data packet to the second string Y of the second data packet may comprise (1) in response to determining the ith string character of the first string is the same as the jth string character of the second string, obtaining $D(X_{i-1}, Y_{j-1})$ as equal to $D(X_i, Y_j)$, (2) in response to determining the ith string character of the first string is different from the jth string character of the second string, obtaining the minimum value of $[D(X_{i-1}, Y_{j-1})+1]$, $[D(X_i, Y_{j-1})+1]$, and $[D(X_{i-1}, Y_j)+1]$ as equal to $D(X_i, Y_j)$, and (3) recursively applying steps (1) and (2) to the first and second strings from their last string characters to obtain $D(X_i, Y_j)$.

According to another aspect, the present disclosure provides a method for program security protection. The method may comprise obtaining information of Application Programming Interface (API) calls executed by a first program, analyzing similarities among the obtained API call information, and determining a security threat to the first program based on the analyzed similarities.

In some embodiments, obtaining information of the API calls executed by the first program may comprise obtaining the API call information for the API calls via a prelog algorithm, the prelog algorithm configured to obtain the API call information, the prelog algorithm being executed before the API call is executed.

In some embodiments, obtaining information of the API calls executed by the first program may comprise obtaining the API call information for the API calls via the prelog and an epilog algorithms. The prelog and the epilog algorithms may be configured to obtain the API call information. The epilog algorithm may be executed after the API call is executed.

In some embodiments, the first program may comprise a software application installed on a computing device, and the prelog algorithm and the epilog algorithm may be incorporated into an operating system of the computing device.

In some embodiments, the obtained API call information for each API call may comprise at least one of an unencrypted file, a size of data, a start position, a key, or an encrypted file.

In some embodiments, the API calls may comprise a plurality of API calls each comprising a key. Analyzing the similarities among the obtained API calls may comprise obtaining a similarity among the keys. Determining the security threat to the first program based on the analyzed similarities may comprise determining the plurality of API calls as associated with the security threat, in response to the obtained similarity exceeding a threshold.

In some embodiments, the obtained API call information may comprise a plurality of API call information strings. Analyzing the similarities among the obtained API calls may comprise determining a number of atomic operations required to change the plurality of API call information strings to a same string. The atomic operation may be selected from: inserting, deleting, or exchanging a string character.

In some embodiments, a first API call information string S may have a length i, a second API call information string T may have a length j, and the number of atomic operations required to change the first API call information string S to the second API call information string T may be $D(S_i, T_j)$. Determining the number of atomic operations required to change the plurality of API call information strings to the same string may comprise: (1) in response to determining the ith string character of the first string is the same as the jth string character of the second string, obtaining $D(S_{i-1}, T_{j-1})$ as equal to $D(S_i, T_j)$, (2) in response to determining the ith string character of the first string is different from the jth string character of the second string, obtaining the minimum value of $[D(S_{i-1}, T_{j-1})+1]$, $[D(S_i, T_{j-1})+1]$, and $[D(S_{i-1}, T_j)+1]$ as equal to $D(S_i, T_j)$, (3) recursively applying steps (1) and (2) to the first and second strings from their last string characters to obtain $D(S_i, T_j)$, and (4) recursively applying steps (1) to (3) to all pairs of API call information strings in the plurality of API call information strings.

According to yet another aspect, the present disclosure provides a system for program security protection. The system may comprise a processor and a non-transitory computer-readable storage medium storing instructions that, when executed by the processor, cause the system to perform a method for program security protection. The method may comprise obtaining data packets transceived by a first program, analyzing similarities among the obtained data packets for a plurality of transmissions, and determining a security threat to the first program based on the analyzed similarities.

According to yet another aspect, the present disclosure provides a system for program security protection. The system may comprise a processor and a non-transitory computer-readable storage medium storing instructions that, when executed by the processor, cause the system to perform a method for program security protection. The method may comprise obtaining information of Application Programming Interface (API) calls executed by a first program, analyzing similarities among the obtained API call information, and determining a security threat to the first program based on the analyzed similarities.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Program security is essential for protecting privacies and properties. Since the programs often communicate private or sensitive information, such as passwords and bank accounts, with various kinds of external devices, the communication easily become targets for malicious hackers. Also, with the increasing use of mobile phones and mobile phone-based software applications, the programs need protection expand from computer-based software programs to include mobile device applications.

However, existing technologies merely check code patterns for the application, and often fail to identify security vulnerabilities. There are many reasons to account for the ineffectiveness of the existing methods. First, code hiding, dynamic loading, code transformation, or obfuscation can significantly cover up a vulnerability. Second, significant human efforts are required to identify recognizable patterns. Third, code change or evolution can render old patterns for vulnerability detection obsolete.

To overcome the inadequacy of current technologies and provide better security protection for target programs, the disclosed systems and methods can detect program vulnerabilities based on monitoring runtime program behavior, such as analyzing packet exchanged and/or API calls triggered by a target program. Similarity analysis can be performed among communications by the target program and/or between communications by the target program and communications of known programs of known vulnerabilities. This analysis can provide indications of communications that are potentially associated with malicious hackers. Accordingly, engineers can respond to update the program design, patch any loopholes, and minimize losses to users. The disclosed systems and methods demonstrate improvements over the existing computing systems and methods at least in terms of (1) discovering vulnerabilities masked by code hiding, dynamic loading, code transformation, and obfuscation; (2) being unaffected by code change and evolution, and (3) automatic deployment by algorithms, obviating pattern studies by human analysts.

Figure 1:
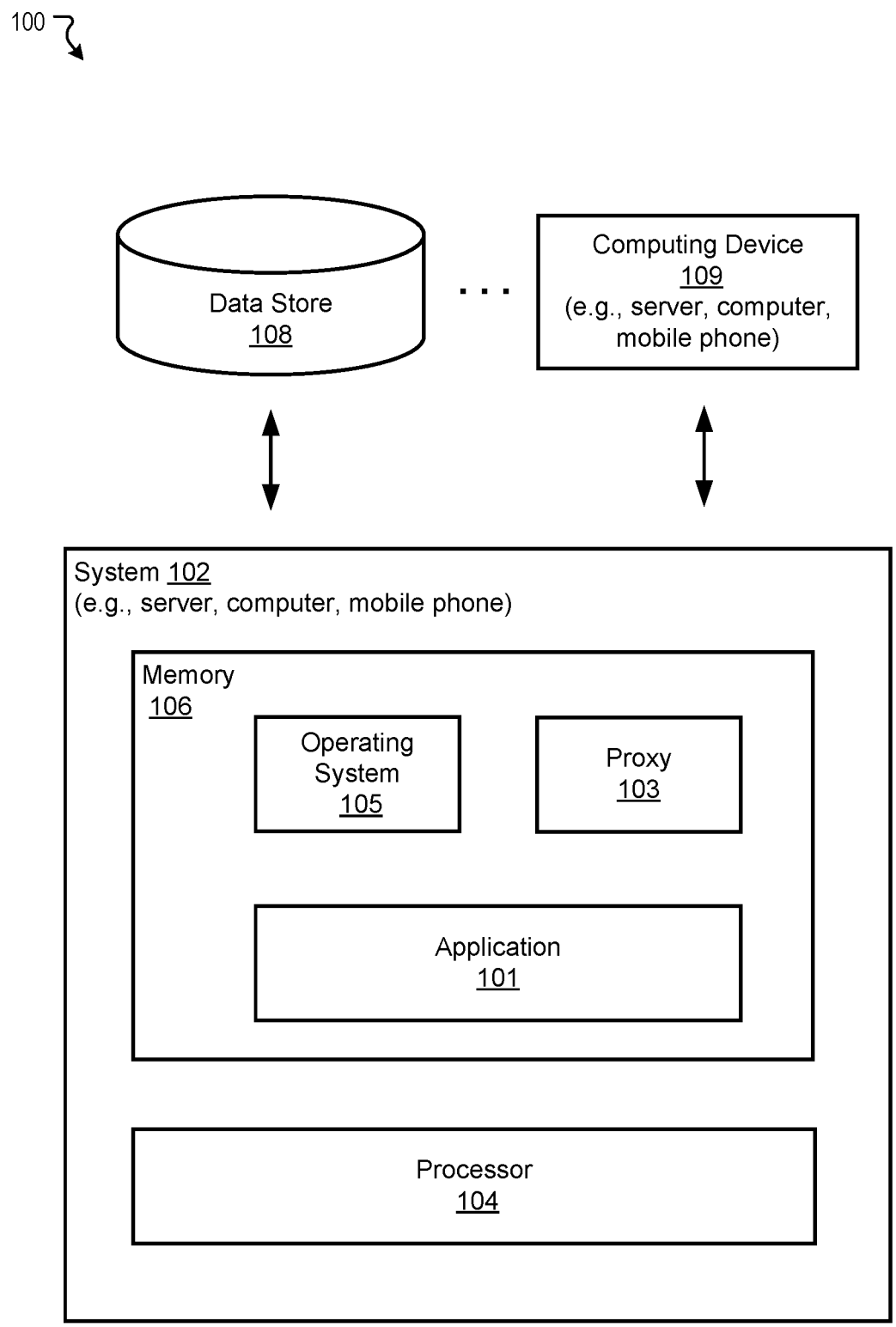
FIG. 1 illustrates an exemplary environment for program security protection, in accordance with various embodiments.

FIG. 1 illustrates an exemplary system 100 for program security protection, in accordance with various embodiments. As shown in FIG. 1, the exemplary system 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as various computing devices such as mobile phone, tablet, server, computer, wearable device (smart watch), etc. The system 102 may be installed with appropriate software (e.g., data transfer program, etc.) and/or hardware (e.g., wire connections, wireless connections, etc.) to access other devices of the system 100.

In some embodiments, the memory 106 may be installed with various programs. For example, the memory 106 may have been installed with an application 101, and the disclosed methods may be performed to protect its security. The application 101 may be a mobile phone application, through which the user may input commands and obtain information. For another example, the memory 106 may be installed with an operating system 105 that manages hardware and software resources of the system 102 and provides common services for other programs. The operating system 105 may be different from a traditional operating system for the purpose of program security protection. A traditional operating system may be improved, updated, or otherwise modified for program security protection (e.g., by incorporating a specialized prelog and/or an epilog) as described in more details below. For yet another example, the memory 106 may be installed with a proxy 103 (e.g., a software program/algorithm) for program security protection. The proxy 103 may comprise various types, e.g., an interactive console program that allows traffic flows to be intercepted, inspected, modified, or replayed.

The system 100 may include one or more data stores (e.g., a data store 108) and one or more computing devices (e.g., a computing device 109) that are accessible to the system 102. In some embodiments, the computing device 109 may be implemented on or as various devices such as mobile phone, tablet, server, computer, wearable device (smart watch), etc.

In some embodiments, the system 102 and the one or more of the computing devices (e.g., the computing device 109) may be integrated in a single device or system. Alternatively, the system 102 and the one or more computing devices may operate as separate devices. The one or more data store (e.g., the data store 108) may be anywhere accessible to the system 102, for example, in the memory 106, in the computing device 109, in another device (e.g., network storage device) coupled to the system 102, or another storage location (e.g., cloud-based storage system, network file system, etc.), etc. The system 102 may be implemented as a single system or multiple systems coupled to each other. In general, the system 102, the computing device 109, and the data store 108 may be able to communicate with one another through one or more wired or wireless networks (e.g., the Internet) through which data can be communicated.

Figure 2:
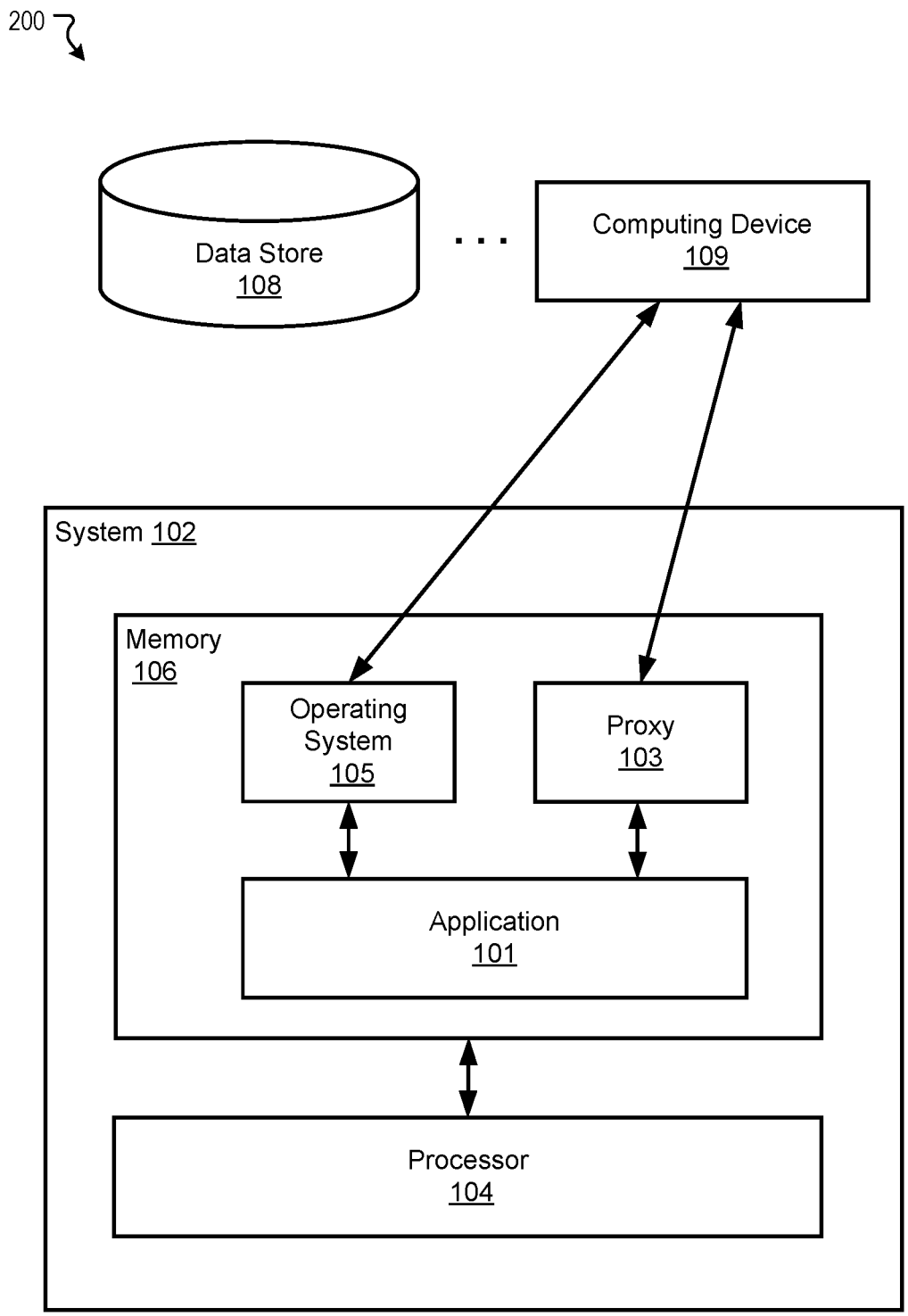
FIG. 2 illustrates an exemplary system for program security protection, in accordance with various embodiments.

FIG. 2 illustrates an exemplary system 200 for program security protection, in accordance with various embodiments. The operations shown in FIG. 2 and presented below are intended to be illustrative. Various devices illustrated in FIG. 2 are the same as those shown in FIG. 1 and described above.

In some embodiments, the system 102 may be a mobile phone, and the application 101 may be a mobile phone application. Traditionally, a user may interact with the application 101, for example, through a touch screen. The application 101 may interface with an operating system of the mobile phone, and the operating system may control hardware components of the mobile phone to communicate with external devices, such as the computing device 109. The external devices may be installed with their own operation systems and applications configured to handle the communications with the system 102.

Figure 3:
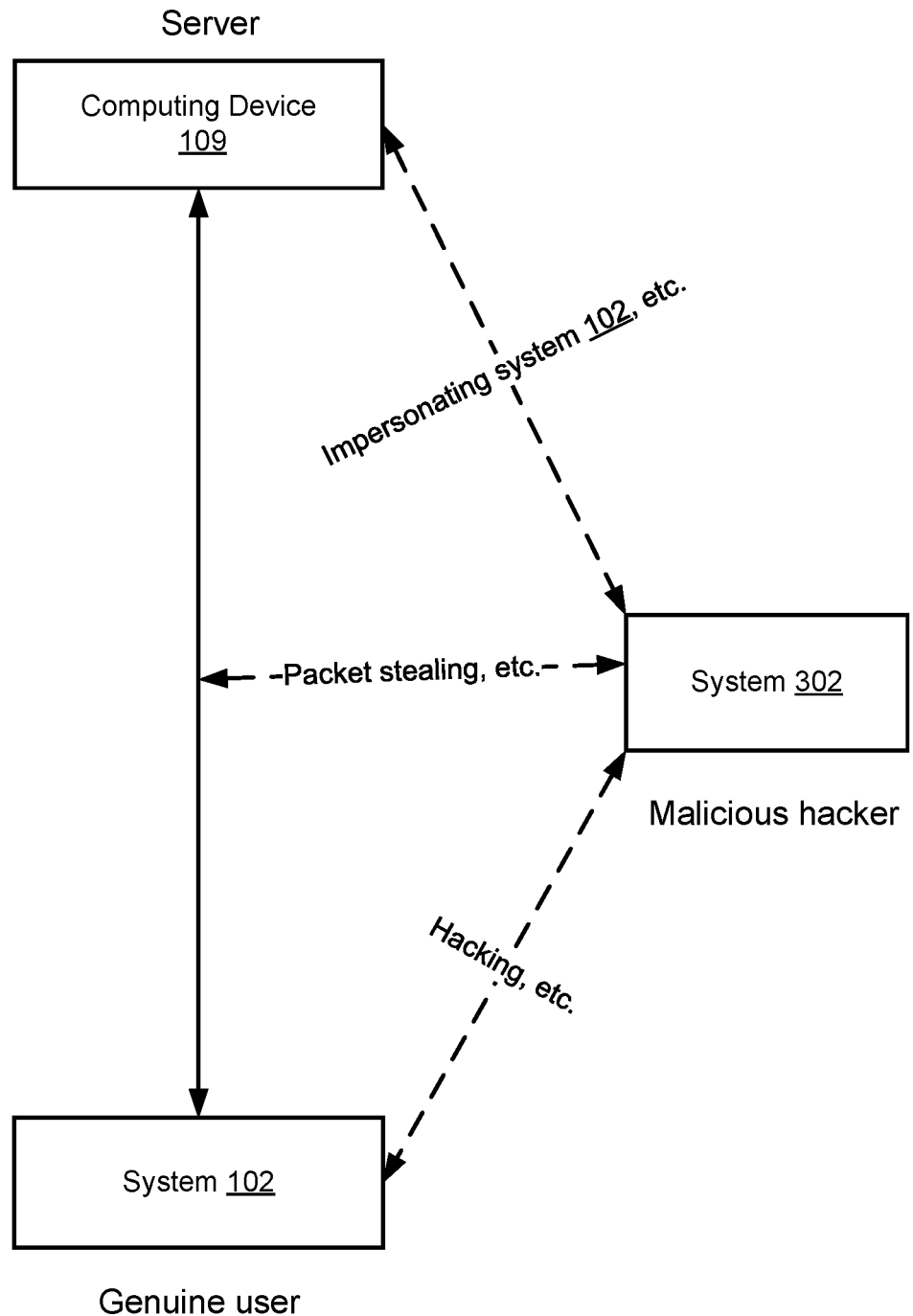
FIG. 3 illustrates an exemplary application scenario for program security protection, in accordance with various embodiments.

Referring to FIG. 3, FIG. 3 illustrates an exemplary application scenario for program security protection, in accordance with various embodiments. The operations shown in FIG. 3 and presented below are intended to be illustrative. As shown in this figure, as a genuine user operates the system 102 to communicate with the computing device 109, a malicious hacker may use a system 302 (e.g., computer, mobile phone, router) with specialized programs (e.g., a backdoor computer virus) and/or hardware (e.g., malicious router) to steal user information. The system 302 may intercept the communication by stealing communication packets, may hack into the system 102 by planting malicious programs, etc. With the stolen user information, the system 302 may impersonate the system 102 or the genuine user to communicate with the computing device 109, and illegally obtain properties belonging to the genuine user.

Referring back to FIG. 2, in various embodiments, to achieve program security protection, the proxy 103 may be installed in the memory 106. The proxy 103 may be configured to monitor data packets associated with the program. Additionally or alternatively, the traditional operation system may be improved to obtain the operating system 105. The operating system 105 may comprise an installed prelog and/or epilog algorithms configured to monitor API calls associated with the program.

In some embodiments, to determine pathways for monitoring the data packets and API calls, execution paths of the application may be explored. For example, the static application and its UI (user interface) views can be explored to obtain as many execution paths as possible and to identify entry points for execution. An application may specify its entry points in one manifest file, which is included in the application binary. Static analysis can recover such information before the application is executed. Moreover, the UI elements may be maintained by a system service named view server. An exploration module can contact the view server to get the list of UI elements present at a particular execution point, and then iterate through the list by triggering UI elements one by one. Depth first traversal or another policy can be used as the iteration policy.

The execution paths may comprise, for example, data exchange paths triggered by button action, slide action, inactivity, refresh, or any other input detectable by the mobile phone. For example, a trigger action for pressing a "submit" button after entering an account name and a password on a mobile phone would submit the account name and password to a remote server for verification. This communication between the mobile phone and the server may correspond to an execution path associated with the button trigger. Once the execution paths are identified, algorithms can be constructed to monitor (e.g., record) data activities for each path, for example, data packet exchanges, API calls, parameters, etc. In the description below, data packet monitoring will be discussed first, followed by the API calls.

With respect to monitoring data packets, in some embodiments, the proxy 103 may cause the system 102 to perform an exemplary method for program security protection. The method may comprise obtaining data packets transceived by the first program, analyzing similarities among the obtained data packets for a plurality of transmissions, and determining a security threat to the first program based on the analyzed similarities. The proxy 103 may be instructions (e.g., specialized algorithms) stored in the memory 106.

Traditionally, no proxy 103 is found in the memory 106, and the application 101 would directly communicate with the computing device 109. In the disclosed method, obtaining the data packets transceived by the first program may comprise installing a second program (e.g., the proxy 103) configured to relay the transmission between the first program (e.g., the application 101) and an external device (e.g., the computing device 109), and obtaining the data packets transceived by the first program via the second program. In a further example, the first program may be a software application installed on a mobile phone, and the second program may be a man-in-the-middle proxy installed on the mobile phone. In this application, "transceive" means transmit or receive.

In some embodiments, the obtained packets may comprise at least one of a header, a payload, or a trailer. The header may contain instructions about the data carried by the packet. The header may comprise at least one of a destination address (e.g., Uniform Resource Locator (URL)) or one or more parameters, and the parameters may comprise at least one of a token (e.g., permission to transmit data), a fingerprint (e.g., configuration attributes of a device), a time (e.g., timestamp), a key (e.g., encryption key, decryption key), or a username. A person of ordinary skill in the art would appreciate the inclusion of various other data information in the header, such as length of packet, synchronization, packet number, protocol (e.g., TCP/IP), originating address, etc. The payload may contain the actual data that the packet is delivering to the destination. The trailer may contain a couple of bits that tell the receiving device that it has reached the end of the packet.

In some embodiments, hackers may steal information (e.g., token and fingerprint in transmitted packets) from transmissions by a genuine user's device, and mask their malicious communications with the stolen information to impersonate the genuine user. When the hacker tries to impersonate the genuine user, the hacker's device may transmit similar data packets as the stolen information, but at a different time from the original transmission of the stolen information. Such action may also be referred to as a replay attack, where a valid data transmission is maliciously or fraudulently repeated or delayed.

To protect program security, similarities among the obtained data packets can be analyzed for multiple transmissions, from which suspicious transmissions linked to the hackers can be identified. A suspicious transmission may appear similar to an earlier transmission, except for the time. For example, the plurality of transmissions may comprise a first transmission and a second transmission. The first transmission may transmit at least first data packets, the first data packets comprising a first time and at least one of a first token or a first fingerprint. The second transmission may transmit at least second data packets, the second data packets comprising a second time and at least one of a second token or a second fingerprint. Analyzing the similarities among the obtained data packets for the plurality of transmissions may comprise obtaining (1) similarities between the first time and the second time and (2) at least one of: similarities between the first token and the second token or similarities between the first fingerprint and the second fingerprint. Determining the security threat to the first program based on the analyzed similarities may comprise determining the second transmission as associated with the security threat, in response to determining that (1) the first time is earlier than the second time, and (2) at least one of: the first token and the second token are the same or the first fingerprint and the second fingerprint are the same. The disclosed method would not falsely identify sequential actions by a genuine user, because if the genuine user uses the same device to communicate with a server at different times, the corresponding token or fingerprint would be encoded differently, besides having the time difference.

With respect to monitoring API calls, the operating system 105 may cause the system 102 to perform a method for program security protection. The method may comprise obtaining one or more execution paths associated with a first program, based on the obtained paths, obtaining information of API calls executed by the first program, analyzing similarities among the obtained API call information, and determining a security threat to the first program based on the analyzed similarities. Here, monitoring the API calls may include hooking API calls at various levels (e.g., library, framework, and/or system calls) and collecting API names, function parameters, and return values.

As described above, the operating system 105 may differ from traditional operating systems. In some embodiments, obtaining information of the API calls executed by the first program may comprise installing a prelog algorithm and/or an epilog algorithm configured to obtain the API call information and obtaining the API call information for the API calls via the prelog algorithm and/or the epilog algorithm. The prelog algorithm may be executed before the API call is executed, and the epilog algorithm may be executed after the API call is executed. In one example, the first program may comprise a software application installed on a mobile phone, and the prelog algorithm and the epilog algorithm may be incorporated into an operating system (the operating system 105) of the mobile phone. API calls can represent specific operations that the application can invoke at runtime to perform tasks, such as query data in a remote server, modify data, run utilities to perform administration tasks, etc. The traditional operating system may comprise an algorithm for executing the API calls, but not the prelog and the epilog algorithms.

In some embodiments, the obtained API call information for each API call may comprise at least one of an unencrypted file, a size of data, a start position, a key (e.g., encryption key, decryption key), or an encrypted file. A person of ordinary skill in the art would appreciation the inclusion of various other types of data in the API call.

In some embodiments, hackers may steal information (e.g., key) from API calls made by a genuine user's device, and encrypt illegal requests (e.g., a request for money transfer) with the stolen key in an attempt to impersonate the genuine user. For the genuine user, the key used for each communication are usually random, to prevent the key from being guessed. Thus, a significant similarity among a plurality of keys may indicate suspicious activity. For example, the API calls may comprise a plurality of API calls each comprising a key. Analyzing the similarities among the obtained API calls may comprise obtaining a similarity among the keys. Determining the security threat to the first program based on the analyzed similarities may comprise determining the plurality of API calls as associated with the security threat, in response to the obtained similarity exceeding a threshold (e.g., 60%).

As described, the system 102 may monitor and perform the similarity analysis on the data packets and/or the API calls at the application runtime. That is, the proxy and/or the prelog can be installed to analyze the similarities and detect suspicious activities. Additionally or alternatively, the data packets and/or API calls of a target application can be compared with the data packets and/or API calls of a known application with known vulnerabilities. For any of the comparisons or similarity analyses, since both the data packets and the API calls may involve transmissions of data strings (data in a string format, each string comprising a series of string characters). Various methods can be applicable to data packets and API calls to determine the similarities.

In some embodiments, the obtained data packets may comprise a first data packet and a second data packet. Analyzing the similarities among the obtained data packets may comprise determining a number of atomic operations required to change a first string X of the first data packet to a second string Y of the second data packet. The atomic operation may be selected from: inserting, deleting, or exchanging a string character.

In one example, the first string X may have a length i, the second string Y may have a length j, the number of atomic operations required to change the first string X to the second string Y may be $D(X_i, Y_j)$. Determining the number of atomic operations required to change the first string X of the first data packet to the second string Y of the second data packet may comprise (1) in response to determining the ith string character of the first string is the same as the jth string character of the second string, obtaining $D(X_{i-1}, Y_{j-1})$ as equal to $D(X_i, Y_j)$, (2) in response to determining the ith string character of the first string is different from the jth string character of the second string, obtaining the minimum value of $[D(X_{i-1}, Y_{j-1})+1]$, $[D(X_i, Y_{j-1})+1]$, and $[D(X_{i-1}, Y_j)+1]$ as equal to $D(X_i)$, and (3) recursively applying steps (1) and (2) to the first and second strings from their last string characters to obtain $D(X_i, Y_j)$. Thus, the comparison between lengthy strings can be reduced and accounted for in each recursion to yield a final quantitative measurement for similarity (e.g., Similarity=1−D/maximum_string_length). This method can be applied to the token, fingerprint, time, or other data in data packets to ascertain the similarities. The above description of similarity analysis is merely exemplary. A person having ordinary skill in the art would appreciate using various other methods to achieve similar results. For example, a brute force algorithm can be used to compare characters in the first string and characters in the second string to identify a percentage of similar characters.

In some embodiments, the obtained API call information may comprise a plurality of API call information strings. Analyzing the similarities among the obtained API calls may comprise determining a number of atomic operations required to change the plurality of API call information strings to a same string. The atomic operation may be selected from: inserting, deleting, or exchanging a string character.

In some embodiments, a first API call information string S may have a length i, a second API call information string T may have a length j, and the number of atomic operations required to change the first API call information string S to the second API call information string T may be D(Si, Tj). Determining the number of atomic operations required to change the plurality of API call information strings to the same string may comprise: (1) in response to determining the ith string character of the first string is the same as the jth string character of the second string, obtaining D(Si−1, Tj−1) as equal to D(Si, Tj), (2) in response to determining the ith string character of the first string is different from the jth string character of the second string, obtaining the minimum value of [D(Si−1, Tj−1)+1], [D(Si, Tj−1)+1], and [D(Si−1, Tj)+1] as equal to D(Si, Tj), (3) recursively applying steps (1) and (2) to the first and second strings from their last string characters to obtain D(Si, Tj), and (4) recursively applying steps (1) to (3) to all pairs of API call information strings in the plurality of API call information strings. Thus, the comparison between lengthy strings can be reduced and accounted for in each recursion to yield a final quantitative measurement for similarity (e.g., Similarity=1−D/maximum_string_length). This method can be applied to the key or other data in API calls to ascertain the similarities. The above description of similarity analysis is merely exemplary. A person having ordinary skill in the art would appreciate using various other methods to achieve similar results. For example, a brute force algorithm can be used to compare characters in the first string and characters in the second string to identify a percentage of similar characters.

As such, the disclosed systems and methods based on analyzing program behavior details (such as data packets exchanged and API calls triggered) can be applied to identify program vulnerabilities undiscovered by current technologies. Program runtime behavior can be obtained for conduct similarity studies. For example, the disclosed data packet monitoring can be used to quickly identify what protocol is used to exchange data and what changes are introduced in latest version. The disclosed API call monitoring can capture non-random crypto-key usages which are not discoverable by traditional static or dynamic analysis. Thus, disclosed systems and methods demonstrate improvements over the existing computing systems and methods at least in terms of discovering vulnerabilities masked by techniques such as code hiding, dynamic loading, code transformation, and obfuscation.

Further, traditional technologies rely heavily on human inputs, such as manually identifying recognizable patterns for discovering vulnerabilities, which often become obsolete after a code change or code evolution. The disclosed systems and methods can be automatically implemented by algorithms, obviating pattern studies by human analysts and synchronized with changes in code generations and developments. Accordingly, the security for programs can be significantly strengthened.

Figure 4A:
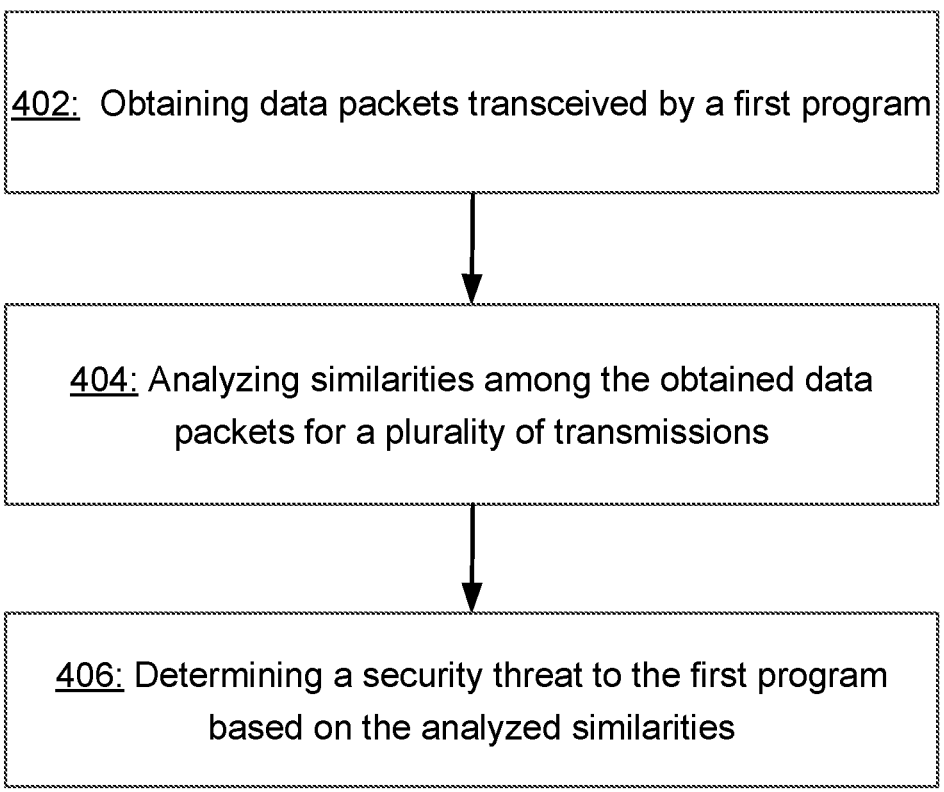
FIG. 4A illustrates a flowchart of an exemplary method for program security protection, in accordance with various embodiments.

FIG. 4A illustrates a flowchart of an exemplary method 400, according to various embodiments of the present disclosure. The method 400 may be implemented in various environments including, for example, the environment 100 of FIG. 1. The exemplary method 400 may be implemented by one or more components of the system 102 (e.g., the processor 104, the memory 106). The exemplary method 400 may be implemented by multiple systems similar to the system 102. The operations of method 400 presented below are intended to be illustrative. Depending on the implementation, the exemplary method 400 may include additional, fewer, or alternative steps performed in various orders or in parallel.

At block 402, data packets transceived by a first program may be obtained. At block 404, similarities among the obtained data packets for a plurality of transmissions may be analyzed. At block 406, a security threat to the first program may be determined based on the analyzed similarities. In some embodiments, the obtained data packets may comprise a first data packet and a second data packet. Analyzing the similarities among the obtained data packets may comprise determining a number of atomic operations required to change a first string X of the first data packet to a second string Y of the second data packet. The atomic operation may be selected from: inserting, deleting, or exchanging a string character.

In some embodiments, the first string X may have a length i, the second string Y may have a length j, the number of atomic operations required to change the first string X to the second string Y may be $D(X_i, Y_j)$. Determining the number of atomic operations required to change the first string X of the first data packet to the second string Y of the second data packet may comprise (1) in response to determining the ith string character of the first string is the same as the jth string character of the second string, obtaining $D(X_{i-1}, Y_{j-1})$ as equal to $D(X_i, Y_j)$, (2) in response to determining the ith string character of the first string is different from the jth string character of the second string, obtaining the minimum value of $[D(X_{i-1}, Y_{j-1})+1]$, $[D(X_i, Y_{j-1})+1]$, and $[D(X_{i-1}, Y_j)+1]$ as equal to $D(X_i, Y_j)$, and (3) recursively applying steps (1) and (2) to the first and second strings from their last string characters to obtain $D(X_i, Y_j)$.

Figure 4B:
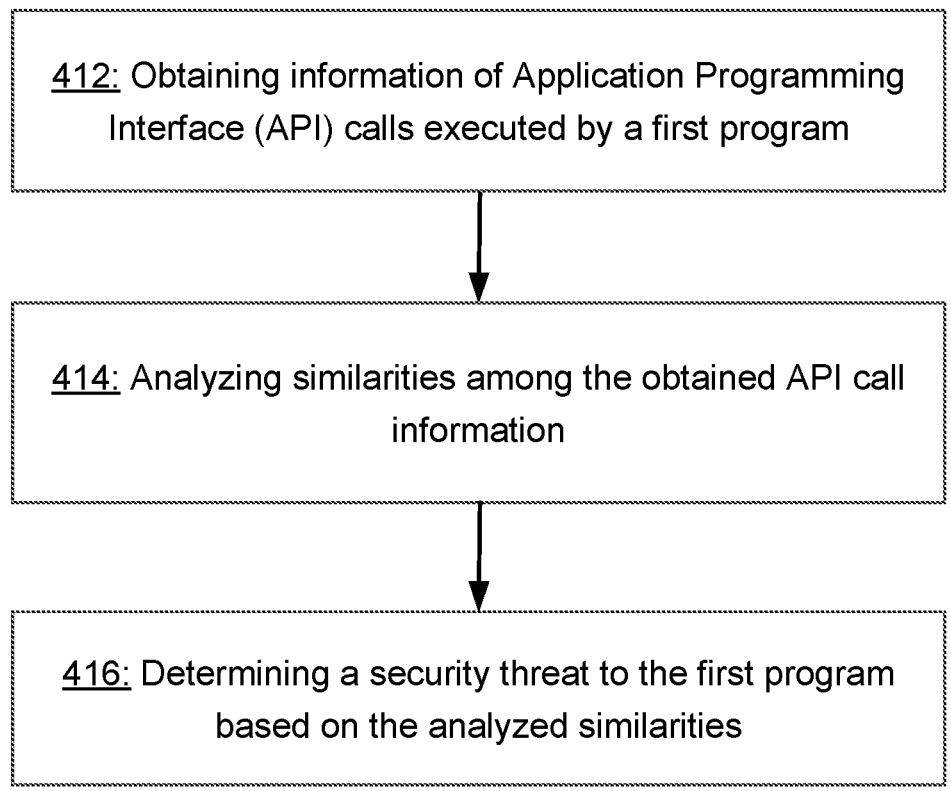
FIG. 4B illustrates a flowchart of another exemplary method for program security protection, in accordance with various embodiments.

FIG. 4B illustrates a flowchart of an exemplary method 410, according to various embodiments of the present disclosure. The method 410 may be implemented in various environments including, for example, the environment 100 of FIG. 1. The exemplary method 410 may be implemented by one or more components of the system 102 (e.g., the processor 104, the memory 106). The exemplary method 410 may be implemented by multiple systems similar to the system 102. The operations of method 410 presented below are intended to be illustrative. Depending on the implementation, the exemplary method 410 may include additional, fewer, or alternative steps performed in various orders or in parallel.

At block 412, information of Application Programming Interface (API) calls executed by a first program may be obtained. At block 414, similarities among the obtained API call information may be analyzed. At block 416, a security threat to the first program may be determined based on the analyzed similarities. In some embodiments, the obtained API call information may comprise a plurality of API call information strings. Analyzing the similarities among the obtained API calls may comprise determining a number of atomic operations required to change the plurality of API call information strings to a same string. The atomic operation may be selected from: inserting, deleting, or exchanging a string character.

In some embodiments, a first API call information string S may have a length i, a second API call information string T may have a length j, and the number of atomic operations required to change the first API call information string S to the second API call information string T may be $D(Si, Tj)$. Determining the number of atomic operations required to change the plurality of API call information strings to the same string may comprise: (1) in response to determining the ith string character of the first string is the same as the jth string character of the second string, obtaining $D(Si-1, Tj-1)$ as equal to $D(Si, Tj)$, (2) in response to determining the ith string character of the first string is different from the jth string character of the second string, obtaining the minimum value of $[D(Si-1, Tj-1)+1]$, $[D(Si, Tj-1)+1]$, and $[D(Si-1, Tj)+1]$ as equal to $D(Si, Tj)$, (3) recursively applying steps (1) and (2) to the first and second strings from their last string characters to obtain $D(Si, Tj)$, and (4) recursively applying steps (1) to (3) to all pairs of API call information strings in the plurality of API call information strings.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
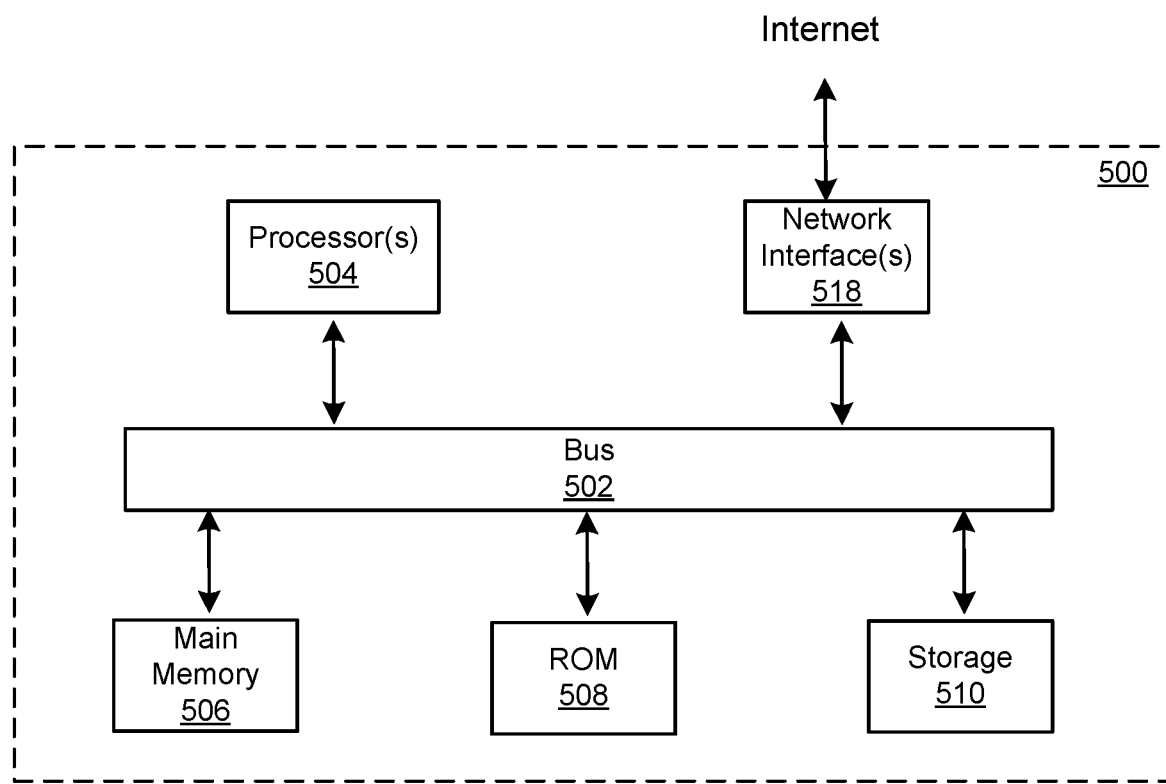
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 or 103 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for program security protection, comprising:
   obtaining information of Application Programming Interface (API) calls to be executed by a first program via a prelog algorithm, wherein the prelog algorithm is configured to obtain the API call information, the prelog algorithm being executed before the API call is executed;
   analyzing similarities among the obtained API call information; and
   determining a security threat to the first program based on the analyzed similarities, wherein:
      the obtained API call information comprises a plurality of API call information strings;
      analyzing the similarities among the obtained API calls comprises determining a number of atomic operations required to change the plurality of API call information strings to a same string;
      a first API call information string S has a length i;
      a second API call information string T has a length j;
      the number of atomic operations required to change the first API call information string S to the second API call information string T is $D(S_i, T_j)$; and
      determining the number of atomic operations required to change the plurality of API call information strings to the same string comprises:
         (1) in response to determining the ith string character of the first string is the same as the jth string character of the second string, obtaining $D(S_{i-1}, T_{j-1})$ as equal to $D(S_i, T_j)$;
         (2) in response to determining the ith string character of the first string is different from the jth string character of the second string, obtaining the minimum value of $[D(S_{i-1}, T_{j-1})+1]$, $[D(S_i, T_{j-1})+1]$, and $[D(S_{i-1}, T_j)+1]$ as equal to $D(S_i, T_j)$;
         (3) recursively applying steps (1) and (2) to the first and second strings from their last string characters to obtain $D(S_i, T_j)$; and
         (4) recursively applying steps (1) to (3) to all pairs of API call information strings in the plurality of API call information strings.

2. The method of claim 1, wherein:
   obtaining information of the API calls executed by the first program comprises obtaining the API call information for the API calls via the prelog and an epilog algorithms;
   the prelog and the epilog algorithms are configured to obtain the API call information; and
   the epilog algorithm is executed after the API call is executed.

3. The method of claim 2, wherein:
   the first program comprises a software application installed on a computing device; and
   the prelog algorithm and the epilog algorithm are incorporated into an operating system of the computing device.

4. The method of claim 1, wherein:
   the obtained API call information for each API call comprises at least one of an unencrypted file, a size of data, a start position, a key, or an encrypted file.

5. The method of claim 1, wherein:
   the API calls comprise a plurality of API calls each comprising a key; and
   analyzing the similarities among the obtained API calls comprises obtaining a similarity among the keys.

6. The method of claim 5, wherein:
   determining the security threat to the first program based on the analyzed similarities comprises determining the plurality of API calls as associated with the security threat, in response to the obtained similarity exceeding a threshold.

7. The method of claim 1, wherein:
   the atomic operation is selected from: inserting, deleting, or exchanging a string character.

8. A system for program security protection, comprising:
   a processor; and
   a non-transitory computer-readable storage medium storing instructions that, when executed by the processor, cause the system to perform a method for security protection, the method comprising:
      obtaining information of Application Programming Interface (API) calls to be executed by a first program via a prelog algorithm, wherein the prelog algorithm is configured to obtain the API call information, the prelog algorithm being executed before the API call is executed;
      analyzing similarities among the obtained API call information; and
      determining a security threat to the first program based on the analyzed similarities, wherein:
         the obtained API call information comprises a plurality of API call information strings;
         analyzing the similarities among the obtained API calls comprises determining a number of atomic operations required to change the plurality of API call information strings to a same string;
         a first API call information string S has a length i;

a second API call information string T has a length j;

the number of atomic operations required to change the first API call information string S to the second API call information string T is $D(S_i, T_j)$; and determining the number of atomic operations required to change the plurality of API call information strings to the same string comprises:

(1) in response to determining the ith string character of the first string is the same as the jth string character of the second string, obtaining $D(S_{i-1}, T_{j-1})$ as equal to $D(S_i, T_j)$;

(2) in response to determining the ith string character of the first string is different from the jth string character of the second string, obtaining the minimum value of $[D(S_{i-1}, T_{j-1})+1]$, $[D(S_i, T_{j-1})+1]$, and $[D(S_{i-1}, T_j)+1]$ as equal to $D(S_i, T_j)$;

(3) recursively applying steps (1) and (2) to the first and second strings from their last string characters to obtain $D(S_i, T_j)$; and (4) recursively applying steps (1) to (3) to all pairs of API call information strings in the plurality of API call information strings.

9. The system of claim 8, wherein:

obtaining information of the API calls executed by the first program comprises obtaining the API call information for the API calls via the prelog and an epilog algorithms;

the prelog and the epilog algorithms are configured to obtain the API call information; and the epilog algorithm is executed after the API call is executed.

10. The system of claim 9, wherein:

the first program comprises a software application installed on the system; and the prelog algorithm and the epilog algorithm are incorporated into an operating system of the system.

11. The system of claim 8, wherein:

the obtained API call information for each API call comprises at least one of an unencrypted file, a size of data, a start position, a key, or an encrypted file.

12. The system of claim 8, wherein:

the API calls comprise a plurality of API calls each comprising a key; and analyzing the similarities among the obtained API calls comprises obtaining a similarity among the keys.

13. The system of claim 8, wherein:

determining the security threat to the first program based on the analyzed similarities comprises determining the plurality of API calls as associated with the security threat, in response to the obtained similarity exceeding a threshold.

14. The system of claim 8, wherein:

the atomic operation is selected from: inserting, deleting, or exchanging a string character.

* * * * *